United States Patent [19]

Linstid, III et al.

[11] Patent Number: 5,762,718

[45] Date of Patent: Jun. 9, 1998

[54] PROCESS FOR REDUCING BLACK SPECKS IN A THERMOTROPIC LIQUID CRYSTAL POLYMER WITH SUCCESSIVE WASHES OF TRIETHYLENE GLYCOL, ETHYLENE GLYCOL AND WATER

[75] Inventors: H. Clay Linstid, III, Clinton, N.J.; John D. Wasmund, Gaffney, S.C.

[73] Assignee: Hoechst Celanese Corporation, Warren, N.J.

[21] Appl. No.: 763,571

[22] Filed: Dec. 10, 1996

Related U.S. Application Data

[63] Continuation of Ser. No. 334,705, Nov. 4, 1994, abandoned.

[51] Int. Cl.$^6$ ............................. B08B 3/02; B08B 3/08
[52] U.S. Cl. ........................... 134/22.18; 134/22.19; 134/26
[58] Field of Search ................. 134/22.19, 22.18, 134/22.17, 29, 38, 26

[56] References Cited

U.S. PATENT DOCUMENTS

| | | | |
|---|---|---|---|
| 2,917,418 | 12/1959 | Cathcart | 134/29 |
| 3,475,218 | 10/1969 | Torrenzano et al. | 134/22.19 |
| 3,485,670 | 12/1969 | Fisher | 134/29 |
| 3,740,267 | 6/1973 | Haylock | 134/10 |
| 3,928,253 | 12/1975 | Thornton et al. | 134/10 |
| 4,371,485 | 2/1983 | Mathes et al. | 264/46.1 |
| 5,041,525 | 8/1991 | Jackson | 528/272 |
| 5,328,982 | 7/1994 | Tindall | 134/29 |

FOREIGN PATENT DOCUMENTS

| | | | |
|---|---|---|---|
| 220839 A1 | 4/1985 | German Dem. Rep. | B08B 3/00 |
| 280661 A3 | 7/1990 | German Dem. Rep. | C11D 7/32 |
| 49-11636 | 3/1974 | Japan | C08G 17/08 |
| 58-47021 | 3/1983 | Japan | C08G 63/22 |
| 58-47022 | 3/1983 | Japan | C08G 63/22 |
| 5-295392 | 11/1993 | Japan . | |

*Primary Examiner*—Jill Warden
*Assistant Examiner*—Saeed Chaudhry
*Attorney, Agent, or Firm*—Karen E. Klumas

[57] ABSTRACT

A process for reducing black specks in anisotropic melt-phase forming liquid crystal polymer which comprises the steps of subjecting a reactor in which an anisotropic melt-forming polymer was formed to successive washes of triethylene glycol, ethylene glycol and at least one water wash, draining the reactor between washes, and drying the reactor after the water wash.

7 Claims, No Drawings

PROCESS FOR REDUCING BLACK SPECKS IN A THERMOTROPIC LIQUID CRYSTAL POLYMER WITH SUCCESSIVE WASHES OF TRIETHYLENE GLYCOL, ETHYLENE GLYCOL AND WATER

"This is a Continuation Ser. No. 08/334,705 filed on Nov. 4, 1994 now abandoned."

BACKGROUND OF THE INVENTION

1. Field of the Invention

This invention relates to a process for reducing black specks in anisotropic, melt-phase forming liquid crystal polymer.

2. Description of the Prior Art

The appearance of dark particulate impurities, termed "black specks", has been noted in anisotropic, melt-forming liquid crystal polymers. In addition to their undesirable appearance, the presence of significant numbers of black specks can create problems in certain end-use applications of the polymer, such as fiber or film, where their presence introduces a site of discontinuity and, therefore, a potential stress or weak spot.

Black specks can be generated at numerous points during polymer production or use, for example, polymerization, compounding, processing, and the like. Contaminants and degradation products are among the chief sources of black specks; however, because of the potentially numerous contributing causes to black speck formation, it is oftentimes very difficult to isolate and/or eliminate their source. Owing to their potential downstream effect, removal of black specks formed during polymerization is of particular interest.

Effective removal of contaminants and degradation products during cleaning operations affords a possible means of reducing black speck formation. Solvent selection is a significant factor in reactor cleaning, which has now been found to influence the extent to which black specks are generated during a subsequent polymerization. A solvent commonly used for many reactor cleaning operations is ethylene glycol. When cleaning reactors used to produce thermotropic liquid crystal polymer, particularly higher melting polymers, ethylene glycol may not provide sufficient cleaning action to reduce the amount of black specks formed during a subsequent polymerization to a level which renders the polymer suitable for use in fiber or film applications.

Accordingly, one aspect of this invention is to provide a process for reducing the occurrence of black specks in the production of anisotropic, melt-forming liquid crystal polymers. Another aspect of this invention is to provide a process for cleaning a reactor in which is formed an anisotropic, melt-forming liquid crystal polymer in a manner which minimizes the occurrence of black specks in an ensuing polymerization of a similar material.

SUMMARY OF THE INVENTION

It has now been found that by utilizing certain reactor cleaning techniques, black speck formation can be reduced. In accordance with this invention, an improved reactor cleaning process is provided wherein the reactor in which anisotropic melt-forming polymer was formed is subjected to a cleaning procedure involving the application of successive washes of triethylene glycol, ethylene glycol and at least one water wash. This cleaning procedure has been found to reduce the formation of black specks, as compared to procedures which involve either a triethylene glycol or ethylene glycol wash followed by a water wash.

DETAILED DESCRIPTION OF THE INVENTION

In the practice of this invention, triethylene glycol ("TEG") is first introduced to a reactor from which polymer has been previously discharged. Flushing the system with a non-reactive gas such as, for example, nitrogen, and maintaining a non-reactive atmosphere while the TEG is introduced to the system provides a means of minimizing reactor cooling, decreasing the cycle time for the cleaning operation and reducing costs. TEG is added to the reactor in an amount sufficient to allow for polymer clean-out, and heated to a temperature at which residual polymer can be glycolized. The TEG is circulated through the reactor, which is herein understood to include auxiliary systems attached to the reactor, e.g., columns, condensers, and the like, to initiate cleaning throughout the unit.

The reactor is then drained and charged with an amount of ethylene glycol ("EG") sufficient to complete polymer clean-out. As in the case of TEG, charging EG under a non-reactive atmosphere minimizes the need for reactor cooling. The EG charged in the subsequent wash operation is circulated through the reactor under pressure at elevated temperature to scavenge any residual TEG and provide additional cleaning action.

The reactor is then discharged and washed with sufficient water to remove residual EG. Following water washing, the unit is drained and dried. Drying is typically accomplished by sparging with a non-reactive gas, e.g., nitrogen and then pulling a vacuum.

In addition to its reduced black speck content, it has been found that the polymer produced following the washing procedure of this invention tends to have less melt point variability than polymer produced in a unit subject to TEG washing followed by water washing. Without wishing to be bound to theory, it is believed that melt point variability may result from residual TEG. The successive washing steps involved in the subject process are believed to be particularly well suited to TEG removal.

In order to minimize costs and unit downtime, it is generally desirable to utilize the minimum number of solvent washes possible to achieve efficacious cleaning. Additional washes, while possible, typically do not add significantly to the benefits achieved by this invention.

The amount of solvent normally charged to the reaction vessel in the initial TEG wash is from about 5 to about 15 volume percent of the vessel. Smaller quantities of TEG may be insufficient to achieve good cleaning, whereas the use of in excess of 15 volume percent of TEG, while possible, may be disadvantageous from a cost perspective. To maintain good cleaning action it is desirable to adjust pressure and volume conditions in the reactor to provide for vigorous foaming of the solvent. Typically, the TEG is heated in the reaction vessel, under pressure to temperatures of from about 300° to about 360° C. Temperatures of preference will vary depending upon the particular polymer which had been produced in the reactor prior to cleaning. When cleaning the reactor of thermotropic liquid crystal polymer having melt points of 270° to 370° C., the use of temperatures of from about 330° to about 355° C. is of particular interest.

System pressures will also vary depending upon the reactor size and configuration, however, typical pressures range from about 35 to about 60 psi with pressures of from about 40 to about 50 psi being of particular interest for routine cleaning. Cleaning periods are subject to variation depending upon the amount of solvent used, and reactor configuration and conditions, however, circulation of the initial solvent wash is typically maintained for a period of from about 1 to about 4 hours.

During the initial solvent wash, TEG will tend to degrade to EG and diethylene glycol. While it may be possible to begin the initial wash with a mixture of TEG and other glycols, starting with a mixed solvent may make it difficult to achieve the desired wash temperatures at the pressures specified above. It has also been found that heating the TEG to temperatures above 360° C. in the cleaning operation may have a deleterious effect on subsequent polymerizations. Without wishing to be bound to theory, it is postulated that overheating the reactor during the initial solvent wash can form products which, if not removed from the system, can cause the formation of tars that contaminate later polymerizations.

Under the conditions of the initial solvent wash, vaporized solvent flashes from the reactor through the various parts of the auxiliary systems. Desirably, flashed solvent is recycled back to the reaction vessel. Where the auxiliary systems are configured such that the reactor vessel is equipped with a packed column attached to one or more condensers which terminate in a distillate receiver, solvent recycling is readily accomplished by attaching a pump drive to the distillate receiver. The use of a recycle pump to sparge solvent back to the gas column assists in maintaining the level of solvent in the reaction vessel. Maintenance of solvent level, together with vigorous solvent foaming, assists in achieving good cleaning action.

In the subsequent EG wash, solvent is generally introduced to the reaction vessel in an amount of from about 3 to about 15 volume percent. The use of smaller quantities of EG may be insufficient to remove residual solvent, whereas larger quantities of solvent may be undesirable from a cost perspective. During the EG wash, the temperature of the reaction vessel is typically maintained at temperatures of from about 200° to about 260° C. Temperatures of from about 240° to about 255° C. are of particular interest for routine cleaning. Typical pressures for the EG wash range from about 30 to about 60 psi, with pressures of from about 40 to about 50 psi being of particular interest for routine cleaning. Depending upon the EG level as well as the size and configuration of the reactor, circulation of EG is typically maintained for a period of from about ½ to about 3 hours. Again, use of a recycle mechanism is desirable from the perspective of maintaining solvent level and conserving cost.

Of particular interest is a process for cleaning a reactor in which an anisotropic melt-forming polymer was formed which comprises the steps of:

(a) introducing a solvent charge of triethylene glycol to the reactor which has been discharged of polymer in an amount sufficient to clean-out residual polymer, (b) heating the solvent, to temperature of from about 330° to about 355° C. to initiate removal of residual polymer from the reactor interior, (c) circulating the solvent through the reactor, (d) draining the solvent from the reactor, (e) introducing ethylene glycol to the reactor in an amount sufficient to complete polymer clean-out and remove residual TEG, (f) heating the EG to temperature of from about 190° to about 245° C., (g) circulating EG through the reactor, (h) draining EG from the reactor, (i) introducing water to the reactor in an amount sufficient to remove residual EG, (j) heating the water to boiling and circulating it through the reactor, (k) draining water from the reactor, (l) repeating steps (i) through (k) to provide a second water wash, and (m) drying the reactor.

The process of this invention has been found to be well-suited to cleaning polymerization vessels in which were produced thermotropic, melt-processable polymers characteristic of which is their ability to form an anisotropic melt phase in which are formed liquid crystals. Included among such polymers are wholly aromatic polyesters, aromatic-aliphatic polyesters, wholly aromatic poly(ester-amides), and aromatic-aliphatic poly(ester-amides), and the like.

EXAMPLES

The following examples are presented to further illustrate this invention. The examples are not, however, intended to limit the invention in any way. Average black speck values as reported in the Examples are determined as follows:

The plates of a Carver laboratory press (model 2518) are preheated to 288° C. and lightly sprayed with Frekote 44 made by Dexter Corporation as a mold release agent. A 5 gram polymer sample is then placed on the bottom plate, the press is engaged, and the sample held between the heated plates at 5000 psi for two minutes. The resulting plaque is removed from the press and cooled. This procedure is performed three times to produce 3 separate plaques. One of the three plaques is then placed over a light table and, over a two minute period all detected specks are counted and the number of specks recorded. The speck counting procedure is repeated for each of the two remaining plaques. The average number of specks for the 3 plaques is the black speck value.

EXAMPLE 1

An oil-heated stainless steel reactor equipped with a nitrogen source, packed column, condenser, distillate receiver and recycle pump configured to return a spray of distillate from the receiver to the packed column was used to produce a liquid crystal polymer having a melting point of 275° to 285° C. and consisting of repeating units derived from hydroxy benzoic acid and 6-hydroxy-2-naphthoic acid. Molten polymer was discharged from the reactor and the reactor was cooled to a temperature of about 325° C.

The reactor was flushed with nitrogen and, under a nitrogen charge, filled to 10 volume percent with a solvent charge of TEG. The TEG was heated to 345° C. under a pressure of 40 psi, causing vigorous boiling of the solvent. Solvent boiling was maintained for a period of 2 hours, during which time distillate collecting in the receiver was sprayed into the top of the packed column to maintain 70% of charged TEG in the reactor. Under nitrogen pressure, TEG was removed from the reactor by opening the bottom valve and draining to a solvent drain tank.

EG in an amount of 6 volume percent was introduced to the reactor. The EG was heated to 245° C. under a pressure of 40 psi. These conditions were maintained for 45 minutes during which time EG collecting in the receiver was sprayed into the packed column to maintain 70% of charged EG in the reactor. Thereafter EG was drained from the reactor.

Water was introduced to the reaction vessel in an amount of 8 volume percent and heated to boiling. These conditions were maintained for 45 minutes after which time the water was drained from the system. A second water wash was conducted following this procedure. Following the removal of the second water wash the system was purged with nitrogen and evacuated to a pressure of 15 mm of mercury pressure to dry the reactor.

The reactor was then used to produce a polymer as described above. These polymerization and cleaning steps were repeated 20 times. An average of these 20 replicate runs yielded polymer having an average black speck value of 6 particles.

Comparative Example 1

An oil-heated stainless steel reactor equipped as described in Example 1 was used to produce a liquid crystal polymer as described in Example 1 having a melting point of 275° to 285° C. and consisting of repeating units derived from hydroxy benzoic acid and 6-hydroxy-2-naphthoic acid. Molten polymer was discharged from the reactor and the reactor was cooled to a temperature of about 325° C.

The reactor was flushed with nitrogen and, under a nitrogen charge, filled to 10 volume percent with a solvent charge of TEG. The TEG was heated to 345° C. under a pressure of 40 psi, causing vigorous boiling of the solvent. Solvent boiling was maintained for a period of 2 hours, during which time distillate collecting in the receiver was sprayed into the top of the packed column to maintain 70 of charged TEG in the reactor. Under nitrogen pressure, TEG was removed from the reactor by opening the bottom valve and draining to a solvent drain tank.

Water was introduced to the reaction vessel in an amount of 8 volume percent and heated to boiling. These conditions were maintained for 45 minutes after which time the water was drained from the system. A second water was conducted following this procedure. Following the removal of the second water wash the system was purged with nitrogen and evacuated to 15 mm of mercury pressure to dry the reactor.

The reactor was then used to produce a polymer as described above. These polymerization and cleaning steps were repeated 20 times. An average of these 20 replicate runs yielded polymer having an average black speck value of 47 particles.

Comparative Example 2

An oil-heated stainless steel reactor equipped as described in Example 1 was used to produce a liquid crystal polymer as described in Example 1 having a melting point of 275° to 285° C. and consisting of repeating units derived from hydroxy benzoic acid and 6-hydroxy-2-naphthoic acid. Molten polymer was discharged from the reactor and the reactor was cooled to a temperature of about 325° C.

The reactor was flushed with nitrogen and, under a nitrogen charge, filled to 10 volume percent with a solvent charge of EG. The EG was heated to 250° C. under a pressure of 60 psi, causing vigorous boiling of the solvent. Solvent boiling was maintained for a period of 2.5 hours, during which time distillate collecting in the receiver was sprayed into the top of the packed column to maintain 70 of charged EG in the reactor. Under nitrogen pressure, EG was removed from the reactor by opening the bottom valve and draining to a solvent drain tank. Following removal of solvent it was determined that insufficient polymer was removed from the tank to proceed further with this procedure.

What is claimed is:

1. A process for cleaning a reactor in which anisotropic melt-forming polymer is formed by a procedure which comprises the steps of subjecting the reactor between polymerizations to successive washes of triethylene glycol, ethylene glycol and at least one water wash, wherein the reactor is equipped with a solvent recycle means and wherein at least the triethylene glycol and ethylene glycol washes are conducted under pressure.

2. A process as described in claim 1 wherein the triethylene glycol wash is conducted at a temperature of from about 330 to about 355° C. and the ethylene glycol wash is conducted at a temperature of from about 240° to about 255° C.

3. A process as described in claim 2 wherein in the triethylene glycol wash, triethylene glycol is charged to the reactor in an amount of from about 5 to about 15 volume percent.

4. A process as described in claim 3 wherein in the ethylene glycol wash, ethylene glycol is charged to the reactor in an amount of from about 3 to about 15 volume percent.

5. A process for cleaning a reactor in which an anisotropic melt-forming polymer was formed which comprises the steps of:

(a) introducing a solvent charge of triethylene glycol to the reactor which has been discharged of polymer in an amount sufficient to clean-out residual polymer, (b) heating the solvent, to temperature of from about 330° to about 355° C. to initiate removal of residual polymer from the reactor interior, (c) circulating the solvent through the reactor utilizing a solvent recycle means to maintain triethylene glyco At a level sufficient to achieve reactor cleaning, (d) draining the solvent from the reactor, (e) introducing ethylene glycol to the reactor in an amount sufficient to complete polymer clean-out and remove residual triethylene glycol, (f) heating the ethylene glycol to temperature of from about 240° to about 255° C., (g) circulating ethylene glycol through the reactor, (h) draining ethylene glycol from the reactor, (i) introducing water to the reactor in an amount sufficient to remove residual ethylene glycol, (j) heating the water to boiling and circulating it through the reactor, (k) draining water from the reactor, and (l) drying the reactor.

6. A process as described in claim 5 wherein a solvent recycle means is utilized during step (e).

7. A process as described in claim 6 wherein steps (i) through (l) are repeated to provide a second water wash.

* * * * *